United States Patent
Wang et al.

(10) Patent No.: US 12,114,247 B2
(45) Date of Patent: *Oct. 8, 2024

(54) METHOD AND APPARATUS FOR A MILLIMETER WAVE COMMUNICATION SYSTEM

(71) Applicant: InterDigital Patent Holdings, Inc., Wilmington, DE (US)

(72) Inventors: Carl Wang, Melville, NY (US);
Yingxue K. Li, San Diego, CA (US);
Onur Sahin, London (GB); Philip J. Pietraski, Jericho, NY (US);
Ravikumar V. Pragada, Warrington, PA (US); Gregg A. Charlton, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 404 days.

This patent is subject to a terminal disclaimer.

(21) Appl. No.: 17/494,589

(22) Filed: Oct. 5, 2021

(65) Prior Publication Data

US 2022/0038989 A1 Feb. 3, 2022

Related U.S. Application Data

(63) Continuation of application No. 16/596,274, filed on Oct. 8, 2019, now Pat. No. 11,140,608, which is a
(Continued)

(51) Int. Cl.
*H04W 40/12* (2009.01)
*H04W 36/00* (2009.01)
(Continued)

(52) U.S. Cl.
CPC ....... *H04W 40/12* (2013.01); *H04W 36/0058* (2018.08); *H04W 36/0079* (2018.08);
(Continued)

(58) Field of Classification Search
CPC ............ H04W 40/12; H04W 36/0079; H04W 36/0058; H04W 48/16; H04W 88/02; H04W 36/12; H04W 48/12
See application file for complete search history.

(56) References Cited

U.S. PATENT DOCUMENTS

| | | |
|---|---|---|
| 5,719,859 A | 2/1998 | Kobayashi et al. |
| 5,754,961 A | 5/1998 | Serizawa et al. |

(Continued)

FOREIGN PATENT DOCUMENTS

| | | |
|---|---|---|
| JP | 2008539608 B2 | 11/2008 |
| JP | 2009-284422 | 12/2009 |

(Continued)

OTHER PUBLICATIONS

Aoki et al., Japanese Patent Publication 2009-284422A English translation.
(Continued)

*Primary Examiner* — John J Lee
(74) *Attorney, Agent, or Firm* — VOLPE KOENIG

(57) ABSTRACT

Methods and apparatuses for millimeter wave (mmW) beam acquisition are disclosed. An apparatus may include a processor and a transceiver configured to receive a plurality of signals. The plurality of signals may be swept over time using a respective plurality of beams, and each signal of the plurality of signals may include a sequence based on an index of a respective one of the plurality of beams. The processor and the transceiver may take a measurement of a first signal of the plurality of signals. The transceiver may transmit a measurement report including the measurement of the first signal of the plurality of signals and the index of a respective one of the plurality of beams.

15 Claims, 11 Drawing Sheets

Related U.S. Application Data continuation of application No. 15/670,706, filed on Aug. 7, 2017, now abandoned, which is a continuation of application No. 14/363,193, filed as application No. PCT/US2012/068206 on Dec. 6, 2012, now Pat. No. 9,730,138.

(51) Int. Cl.
  *H04W 48/16* (2009.01)
  *H04W 88/02* (2009.01)
  *H04W 36/14* (2009.01)
  *H04W 48/12* (2009.01)

(52) U.S. Cl.
  CPC ........... *H04W 48/16* (2013.01); *H04W 88/02* (2013.01); *H04W 36/14* (2013.01); *H04W 48/12* (2013.01)

(56) References Cited

U.S. PATENT DOCUMENTS

| | | | |
|---|---|---|---|
| 6,433,738 | B1 | 8/2002 | Kikuchi |
| 6,690,716 | B1 | 2/2004 | Tsumura |
| 6,714,780 | B1 | 3/2004 | Antonio et al. |
| 6,975,604 | B1 | 12/2005 | Ishida et al. |
| 7,218,623 | B1 * | 5/2007 | Proctor, Jr. ........ H04W 72/0473 370/335 |
| 7,272,126 | B2 | 9/2007 | Soltanian et al. |
| 7,551,663 | B1 | 6/2009 | Proctor, Jr. |
| 8,218,427 | B2 | 7/2012 | Lee et al. |
| 8,731,555 | B2 | 5/2014 | Yokoyama |
| 8,755,755 | B2 | 6/2014 | Hoshino et al. |
| 9,173,187 | B2 | 10/2015 | Moshfeghi |
| 9,756,589 | B2 | 9/2017 | Rausch et al. |
| 10,411,784 | B2 | 9/2019 | Kwon et al. |
| 10,505,615 | B2 | 12/2019 | Islam et al. |
| 10,517,023 | B2 | 12/2019 | Axelsson et al. |
| 2002/0049039 | A1 | 4/2002 | Natarajan |
| 2002/0080024 | A1 | 6/2002 | Nelson, Jr. et al. |
| 2004/0192326 | A1 | 9/2004 | Stern-Berkowitz et al. |
| 2005/0197124 | A1 | 9/2005 | Kang et al. |
| 2005/0207373 | A1 | 9/2005 | Roy et al. |
| 2006/0126491 | A1 | 6/2006 | Ro et al. |
| 2007/0140178 | A1 | 6/2007 | Jung et al. |
| 2007/0147336 | A1 | 6/2007 | Lee et al. |
| 2008/0165702 | A1 | 7/2008 | Bienas et al. |
| 2008/0189970 | A1 | 8/2008 | Wang et al. |
| 2008/0207200 | A1 | 8/2008 | Fein et al. |
| 2009/0323608 | A1 | 12/2009 | Adachi et al. |
| 2010/0074190 | A1 | 4/2010 | Cordeiro et al. |
| 2010/0080197 | A1 * | 4/2010 | Kanellakis ............ H04W 48/18 455/456.1 |
| 2010/0081381 | A1 | 4/2010 | Rofougaran |
| 2010/0081451 | A1 | 4/2010 | Mueck et al. |
| 2010/0118834 | A1 | 5/2010 | Kalhan |
| 2010/0291940 | A1 | 11/2010 | Koo et al. |
| 2010/0317375 | A1 | 12/2010 | Burbidge et al. |
| 2010/0331028 | A1 | 12/2010 | Cordeiro et al. |
| 2011/0002373 | A1 | 1/2011 | Jeon |
| 2011/0026503 | A1 | 2/2011 | Mueck et al. |
| 2011/0116476 | A1 | 5/2011 | Lee et al. |
| 2011/0211562 | A1 | 9/2011 | Taghavi Nasrabadi et al. |
| 2011/0255486 | A1 | 10/2011 | Luo et al. |
| 2012/0201195 | A1 | 8/2012 | Rausch et al. |
| 2012/0289284 | A1 | 11/2012 | Kuningas |
| 2012/0320874 | A1 | 12/2012 | Li et al. |
| 2013/0028126 | A1 | 1/2013 | Kazmi |
| 2013/0121185 | A1 | 5/2013 | Li et al. |
| 2013/0150057 | A1 | 6/2013 | Cho et al. |
| 2014/0349664 | A1 | 11/2014 | Pedersen et al. |
| 2016/0337916 | A1 | 11/2016 | Deenoo et al. |
| 2017/0127434 | A1 | 5/2017 | Kazmi |
| 2017/0195998 | A1 | 7/2017 | Zhang et al. |
| 2017/0215191 | A1 | 7/2017 | Martin |

FOREIGN PATENT DOCUMENTS

| | | | | |
|---|---|---|---|---|
| JP | 2009284422 | A | * 12/2009 | ............... H04Q 7/00 |
| JP | 2010-154399 | | 7/2010 | |
| JP | 2010154399 | A2 | 7/2010 | |
| WO | 9850909 | A1 | 11/1998 | |
| WO | 2010/078590 | | 7/2010 | |
| WO | 2011/097416 | | 8/2011 | |
| WO | 2011/106517 | | 9/2011 | |
| WO | 2011106517 | A1 | 9/2011 | |
| WO | 2011142710 | A1 | 11/2011 | |

OTHER PUBLICATIONS

Brown et al., "Extreme Beam Broadening Using Phase Only Pattern Synthesis," Fourth IEEE Workshop on Sensor Array and Multichannel Processing, pp. 36-39 (Jul. 12-14, 2006).

Khan et al., "mmWave mobile broadband (MMB): Unleashing the 3-300GHz spectrum," 34th IEEE Sarnoff Symposium, pp. 1-6 (May 3-4, 2011).

Third Generation Partnership Project, "Technical Specification Group Radio Access Network; Evolved Universal Terrestrial Radio Access (E-UTRA); Physical layer procedures (Release 10)," 3GPP TS 36.213 V10.3.0 (Sep. 2011).

Third Generation Partnership Project, "Technical Specification Group Radio Access Network; Evolved Universal Terrestrial Radio Access (E-UTRA); Physical layer procedures (Release 10)," 3GPP TS 36.213 V10.7.0 (Sep. 2012).

Third Generation Partnership Project, "Technical Specification Group Radio Access Network; Evolved Universal Terrestrial Radio Access (E-UTRA); Physical layer procedures (Release 11)," 3GPP TS 36.213 V11.0.0 (Sep. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.5.0 (Sep. 2011).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.8.0 (Jun. 2012).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.3.0 (Sep. 2012).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.3.0 (Sep. 2011).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.6.0 (Sep. 2012).

Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.0.0 (Sep. 2012).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.3.0 (Sep. 2011).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.7.0 (Sep. 2012).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.1.0 (Sep. 2012).

Yamauchi et al., "A Broadband Communication System on 60GHz Milli-meter wave: Access Control," Communications Society Con-

(56) References Cited

OTHER PUBLICATIONS ference, the Institute of Electronics, Information and Communication Engineers, p. 458 (Sep. 7, 2006).

* cited by examiner

METHOD AND APPARATUS FOR A MILLIMETER WAVE COMMUNICATION SYSTEM

CROSS REFERENCE TO RELATED APPLICATIONS

This application is a continuation of U.S. patent application Ser. No. 16/596,274 filed Oct. 8, 2019, which issued as U.S. Pat. No. 11,140,608 on Oct. 5, 2021, which is a continuation of U.S. patent application Ser. No. 15/670,706 filed Aug. 7, 2017 which is abandoned, which is a continuation of U.S. patent application Ser. No. 14/363,193 filed Jun. 5, 2014, which issued as U.S. Pat. No. 9,730,138 on Aug. 8, 2017, which claims the benefit of U.S. provisional application No. 61/568,639, filed Dec. 8, 2011, and PCT application No. PCT/US2012/068206, filed on Dec. 6, 2012, the contents of which are hereby incorporated by reference herein.

BACKGROUND

The third generation partnership program (3GPP) introduced long term evolution (LTE) to increase cellular network bandwidth for anticipated mobile data demand. However, the projected mobile data demand growth may output the capacity of even LTE-Advanced (LTE-A). The delivery of high speed mobile data may be implemented using millimeter wave (mmW). For example, further generations of high speed mobile data may be delivered using 60 GHz mmW.

SUMMARY

Methods and apparatuses for millimeter wave (mmW) beam acquisition are disclosed. An apparatus may include a processor and a transceiver configured to receive configuration information from a first network node using a first radio access technology (RAT). The configuration information may include an index associated with a beam of a second network node and timing information corresponding to the first RAT. The second network node may use a second RAT. The apparatus may be further configured to transmit a measurement report to the first network node that includes a measurement of the beam and index associated with the beam of the second network node.

BRIEF DESCRIPTION OF THE DRAWINGS

A more detailed understanding may be had from the following description, given by way of example in conjunction with the accompanying drawings wherein.

DETAILED DESCRIPTION

Figure 1A:
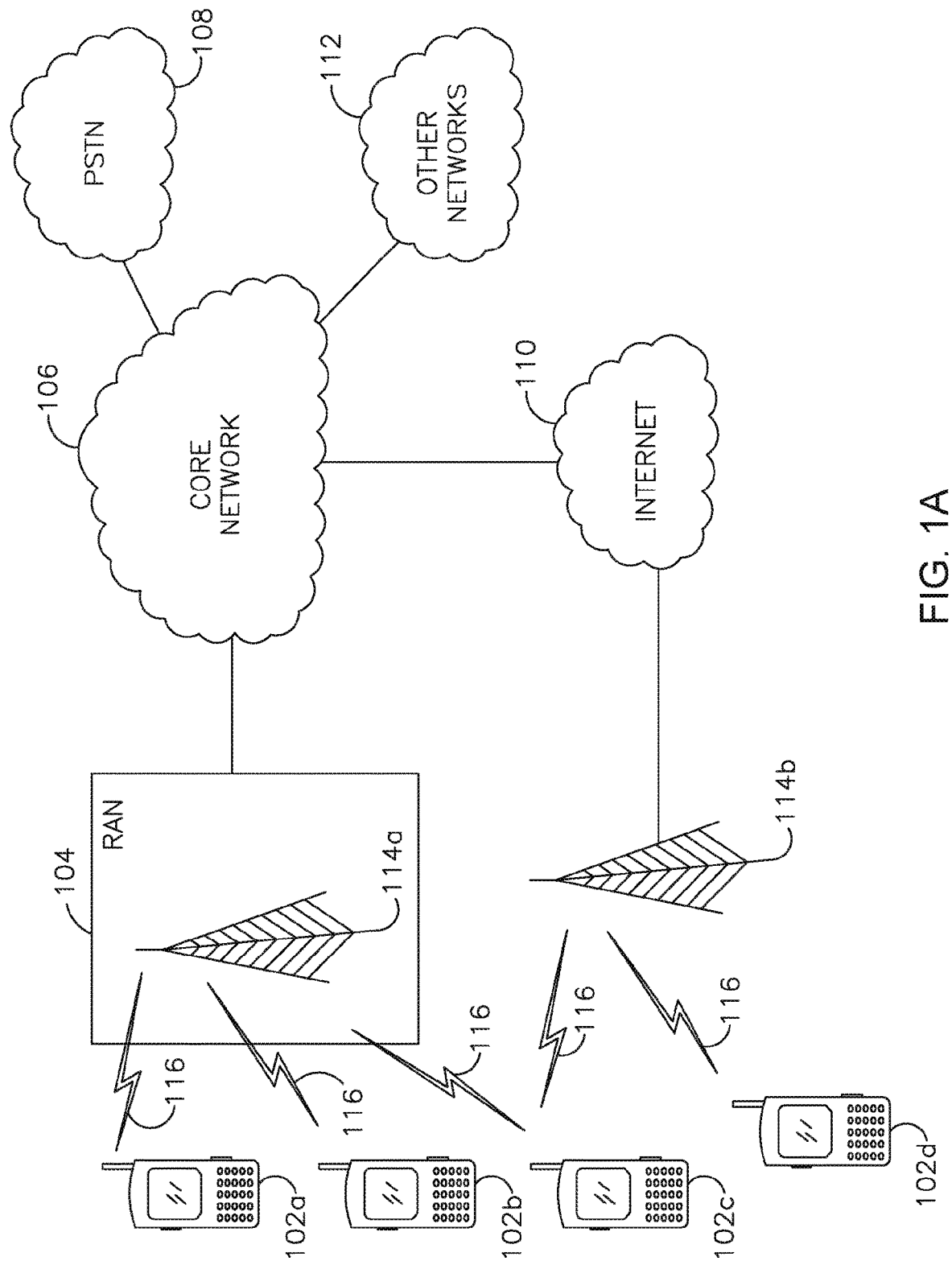
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
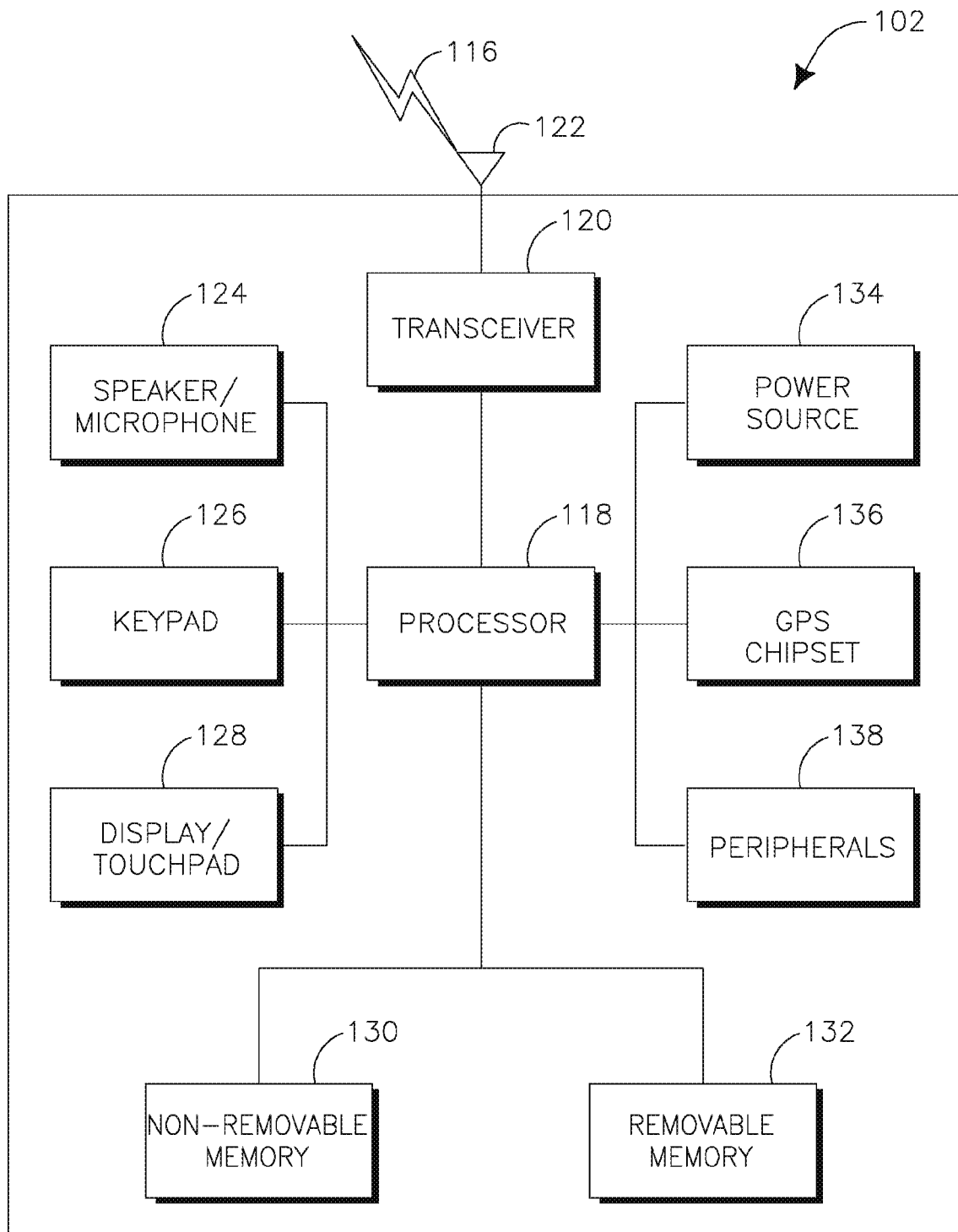
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
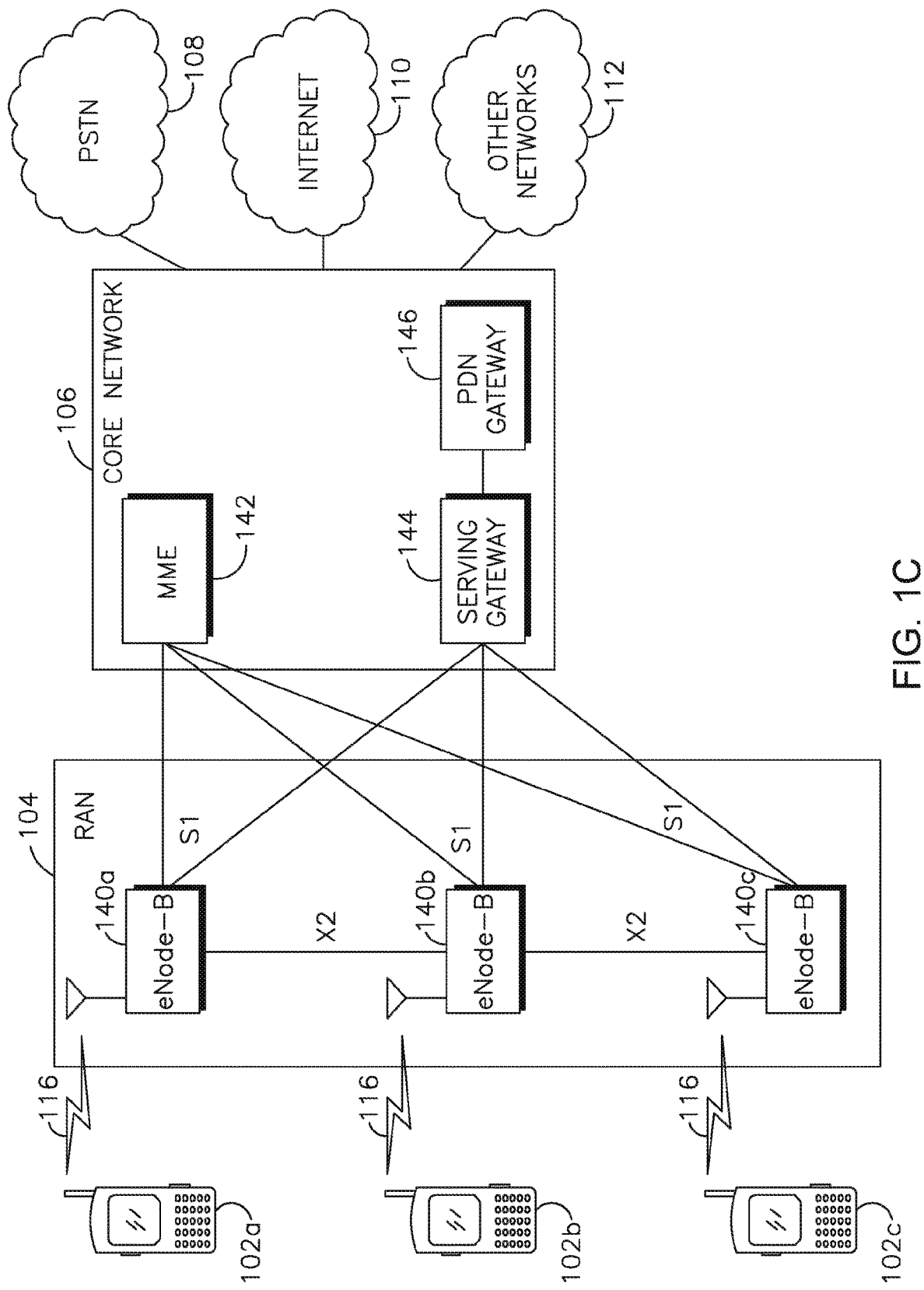
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The Radio Network Evolution (RNE) described herein includes a new network node, a millimeter wave base station (mB). It may be used as mmW access links to mobiles units, or WTRUs and mmW backhaul (BH) links to other mBs and to the cellular base station. An mmW supported WTRU, (hereinafter referred to as an mWTRU for purposes of illustration), may be connected to the cellular layer before the mWTRU may receive data on the mmW layer. The mWTRUs may support mmW capabilities on a downlink (DL) with or without an uplink (UL). All mWTRUs may retain both UL and DL cellular capabilities with mmW channels assigned. The cellular layer may be used for one or more of mmW network control, connectivity and mobility management, and may carry L2/3 control messages thus alleviating the mB from the costs of these functions.

Described herein is the mmW channel description. A mmW link may be defined as the delivery of baseband symbols from a mmW beam forming capable transmitter to a mmW beam forming capable receiver. For example, the mmW DL link consists of an mB transmit beam forming with an mWTRU beam filtering on the reception side. Both mB and mWTRU have a transmitter as well as a receiver. A mmW resource unit (mRU) may include a specific combination of beam forming, (beamwidth and direction), and time slot, (a time slot is a fraction of a LTE subframe and is aligned to the LTE physical downlink control channel (PDCCH) frame timing). Each mRU may be dedicated to the controlling mB scheduling but the responsibility of mRU assignment to mWTRU resides with the meNB.

Described herein is mmW receive signal gain. A method to effectively increase the receive signal strength without increasing transmission power at the mB may be achieved by applying beam forming. The receiver gain may be increased by reducing the beam width of either or both the transmitter or receiver. One method affectively change the beam width is by applying phase shifting.

The RNE system capability may include one or more of: 1) location based service (LBS) or equivalent that provides sufficient accuracy to the meNB in locating the neighboring mB relative to a target mWTRU; 2) mmW resource assigned to mWTRU on demand; and 3) mB access link deactivation when no mWTRUs are assigned and activated on mWTRU acquisition.

Figure 2:
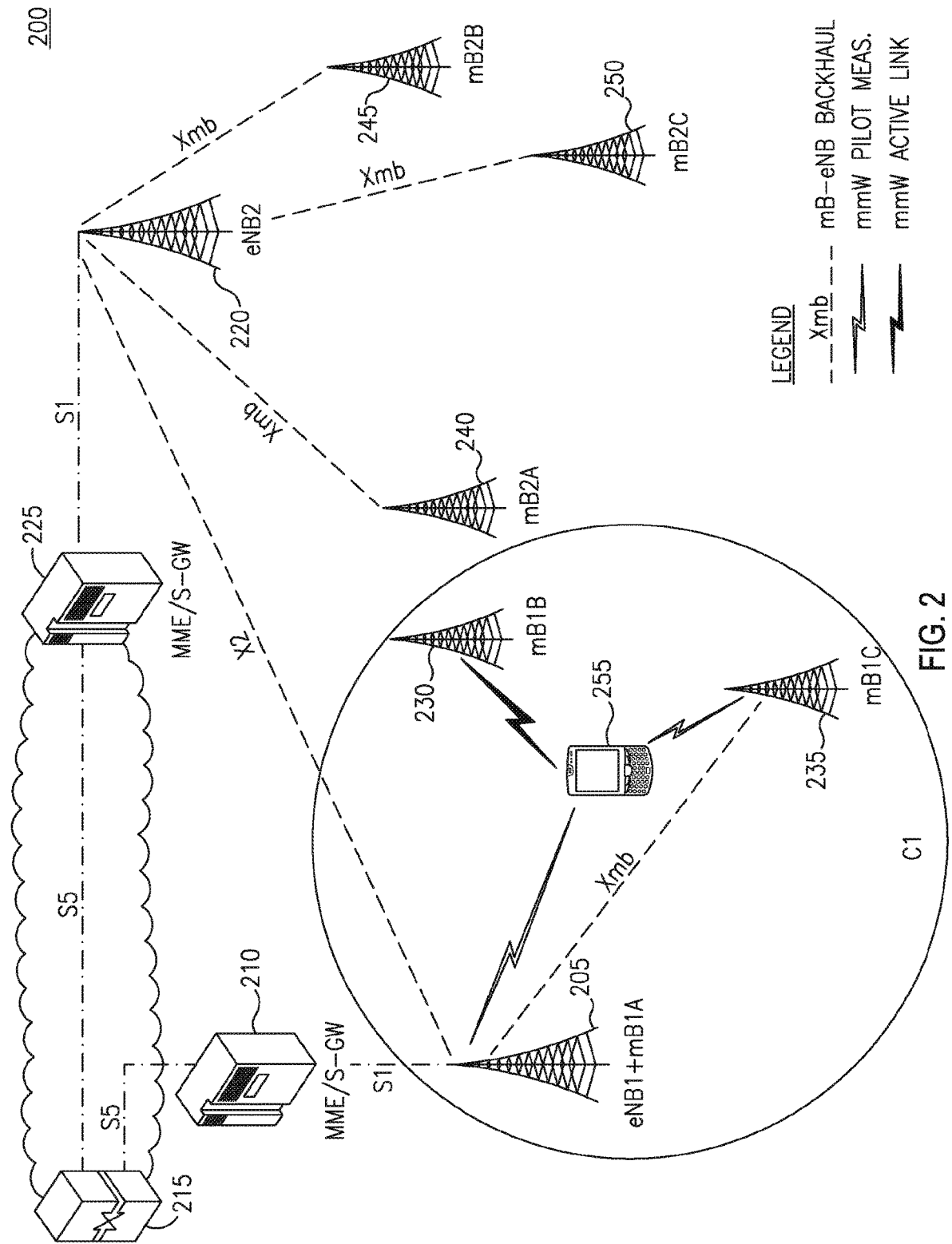
FIG. 2 is an example integrated millimeter wave (mmW)+ long term evolution (LTE) (mmW+LTE) system.

FIG. 2 shows an example integrated millimeter wave (mmW)+long term evolution (LTE) (mmW+LTE) system 200 that includes an eNB1+mB1A 205 having a link with a MME/S-GW 210 and an eNB2 220 through the X2 interface. Further the eNB2 200 may have a link with a MME/S-GW 225, where both the MME/S-GW 210 and 225 are in link with a P-GW 215. The eNB1+mB1A 205 may have a link over the Xmb interface with an mB1B 230 and an mB1C 235 and the eNB2 220 may have a link with an mB2A 240, an mB2B 245 and an mB2C 250. An mWTRU 255 may be have links with the eNB1+mB1A 205, mB1B 230 and mB1C 235.

In the mmW+LTE integrated system 200, the mWTRU 255 may remain connected to the cellular system, (e.g., LTE network), for the majority of the time. The mmW sub network may be utilized on demand when a service requiring mmW is requested such as high speed user data. The mmW link may be maintained only for the duration of the requested service. Therefore, each time a service is requested, an mmW acquisition procedure may be performed by the network to establish a mmW link for the target mWTRU.

The meNB that controls the mmW sub network may make the determination of when to initiate mmW service for a mWTRU. As shown in FIG. 2, the meNB 205 may select a target mB, (for example mB1C 235), based on mmW related information provided by the mWTRU, (such as mWTRU orientation and position, mmW capability, and the like), and available mB information, (such as available mB coordinates with or without historical mmW connection information), and then may trigger the mmW acquisition procedure.

During the acquisition process, the mWTRU may acquire an mB/beam combination that meets certain link quality requirements and achieve timing synchronization, (symbol, frame, slot, and the like), with the selected mB/beam combination. The acquisition process may then be performed on the mRU configured by the meNB. Upon completion of the acquisition procedure, the mWTRU may then be ready to transmit or receive user data on an assigned mmW link.

In conventional cellular systems operated in lower frequency bands, specialized channels are available cell-wide to facilitate system acquisition process. For example in LTE, symbol synchronization is achieved via primary synchronization channel (PSCH) and secondary synchronization channel (SSCH) and basic system information is broadcasted to all users in the coverage area via a broadcast channel (BCH). On the other hand, the mmW system link quality relies on high gain narrow beams from the transmitter and/or receiver, and proper alignment of the beam(s) due to its propagation property. A cell-wide channel is not available in the mmW system since the directionality of beam forming limits signal coverage to narrow beam areas corresponding to the beam width. The methods described herein below utilize readily available cellular systems to assist mmW acquisition, and various embodiments may provide faster acquisition, lower power consumption, and the like.

These methods address at least the following situations: 1) that the mmW acquisition procedure has to account for different path delays on the mWTRU-mB and mWTRU-meNB link in establishing timing synchronization; and 2) that the mmW acquisition procedure coordinates decisions and execution times on relevant nodes, (e.g., mWTRU, mB, and meNB). In addition, the sequence of triggering messages is also described herein below.

Described herein is a high level mmW acquisition procedure that leverages assistance from existing wireless systems. The 3GPP LTE cellular system may be referenced as an example system for description purposes to illustrate control plane support, but other systems may also be used, including UMTS, WIMAX, and the like.

Figure 3:
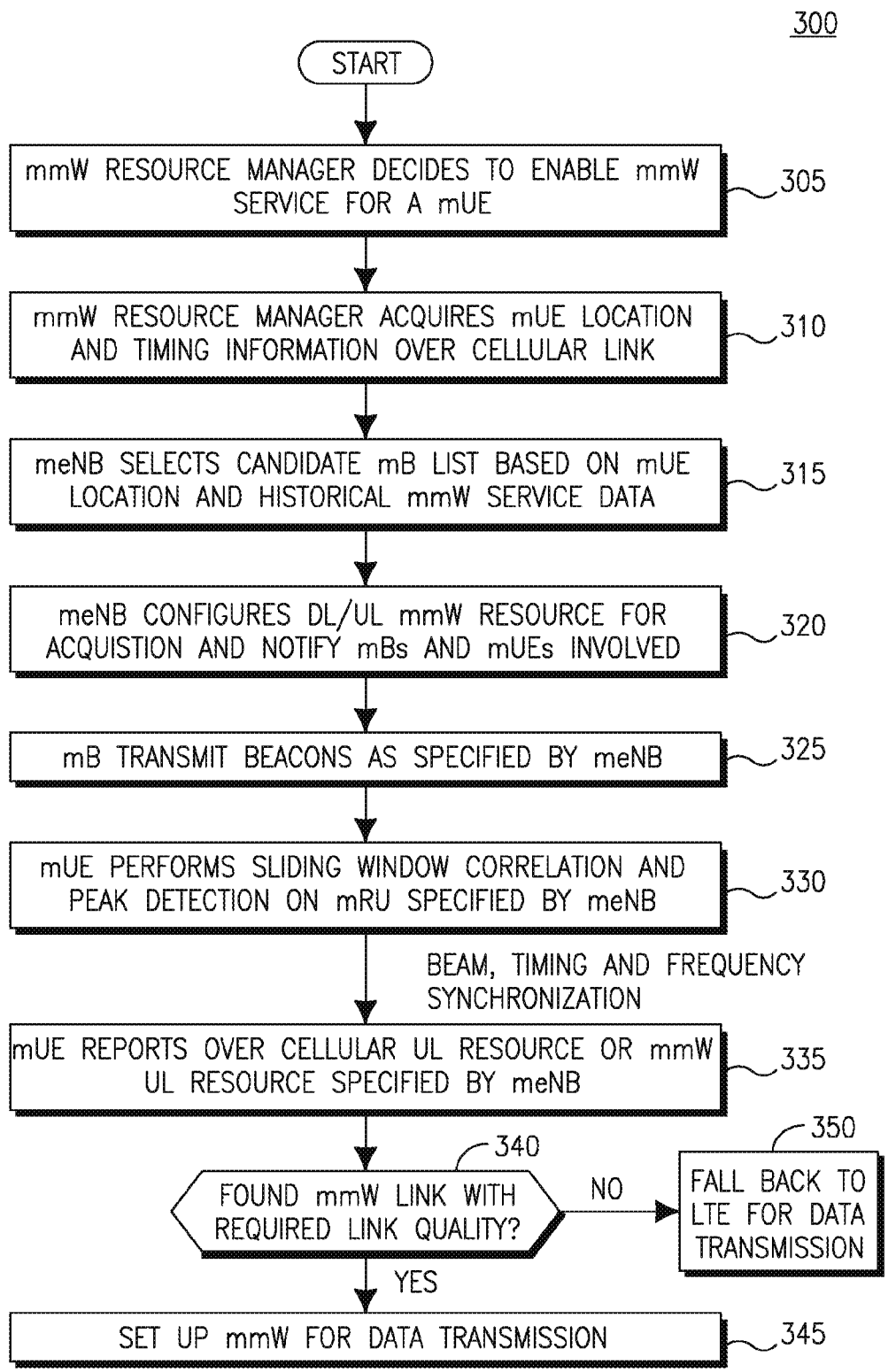
FIG. 3 is an example mmW acquisition process flow.

FIG. 3 shows an example mmW acquisition procedure 300. The mmW acquisition procedure 300 acquires synchronization on several components of mmW communication properties for a transmitter and receiver pair to establish wireless communication. These mmW communication properties include at least the base carrier frequency, the directional alignment of transmitter and receiver beam forming, and timing. This synchronization allows reception of a user data packet over the mmW link.

Initially, the mmW resource management (MRM) function on an meNB may decide when an mmW link may be assigned to an mWTRU (305). The MRM may acquire some basic mWTRU information over the cellular system (310). The basic mWTRU information may include but is not limited to location, coarse timing, mmW capability of mWTRU and the like. The meNB may generate a candidate mB list based on the mWTRU information and a data base that maintains historical mmW link measurement statistics (if available) (315). The meNB may also consider other factors such as grouping of mWTRU with same mobility pattern at mB/eNB, the loading of the mBs, mBs resource availability, and the mBs ability to support the QoS requirements. For each mB in the candidate list, the meNB may also generate a preferred beam list.

The meNB may then notify both the mWTRU and the mB(s) in the candidate list of some or all of the information described herein below (320). For example, this information may include the physical layer mmW acquisition start time with reference to cellular timing. This may also be done using the coarse timing information obtained from the cellular underlay system. In another example, the information may include the number of beam sweeping repetitions, which may be derived from mWTRU mmW capability and its location. For instance, if an mWTRU is located near the edge of the mB coverage and likely needs receiver beamforming to establish a mmW link, multiple repetitions may be configured. On the other hand, if a mWTRU operate in omni antenna mode, then single repetition may be configured.

The information may further include, for example, mB and beam specific indices corresponding to signature sequences that may be used in beacon transmission as described herein below. In another example, the information may include the resources that may be used for mWTRU reporting. The mWTRU may feedback results of mmW acquisition over cellular channel or mmW channel. Multiple mWTRUs may be configured to perform mmW acquisition simultaneously. In such a case, different reporting resources may be assigned to each mWTRU so that reports may not collide. The resources may be differentiated by frequency, time, or code.

At the mmW acquisition start time, each mB may initiate transmitting acquisition beacons on the assigned mRU, and with sequential beams specified in the preferred beam list (325). The beacons may be modulated by each mB and beam specific sequences. In the meantime, the mWTRU may perform sliding window correlation around the specified mmW acquisition start time, using all sequences corresponding to the mBs and the beams in the candidate list (330). A peak detection module may be used to detect the best mB/beam combination and this may achieve timing and frequency synchronization at the same time.

The mWTRU may report to the network the following information described herein below (335). For example, the information may include the N highest received mmW signal strengths across all candidate mB/beam combinations and associated mB and beam indices. Based on the mWTRU report and along with other information such as the mB load status, the network may decide (340) to either setup an mmW link for the subsequent data transmission (345) or fall back to the cellular system (350). The eNB may also update its mmW link database from the received mUE reports.

Figure 4A:
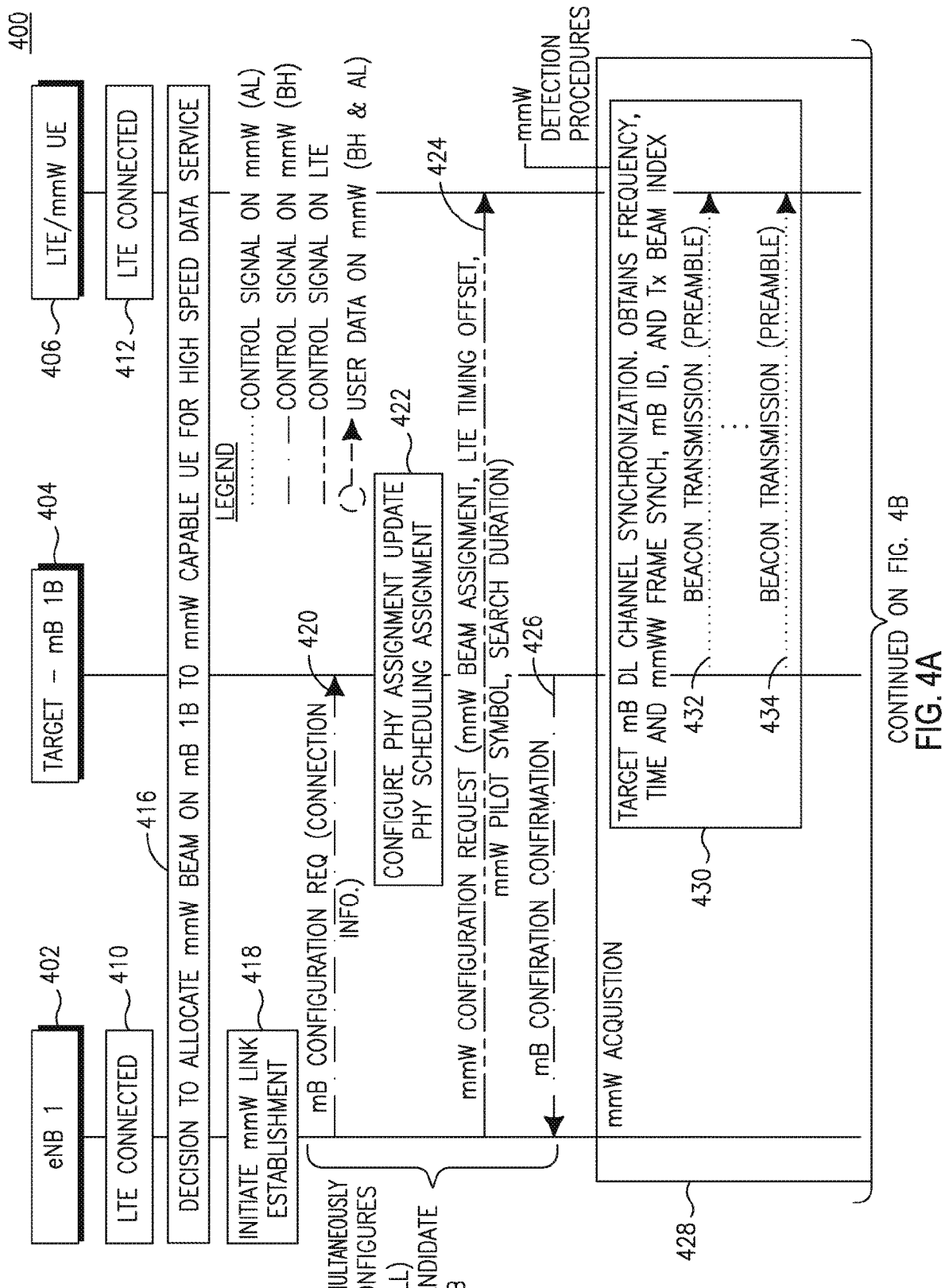
FIGS. 4A and 4B show an example mmW acquisition message flow sequence.
Figure 4B:
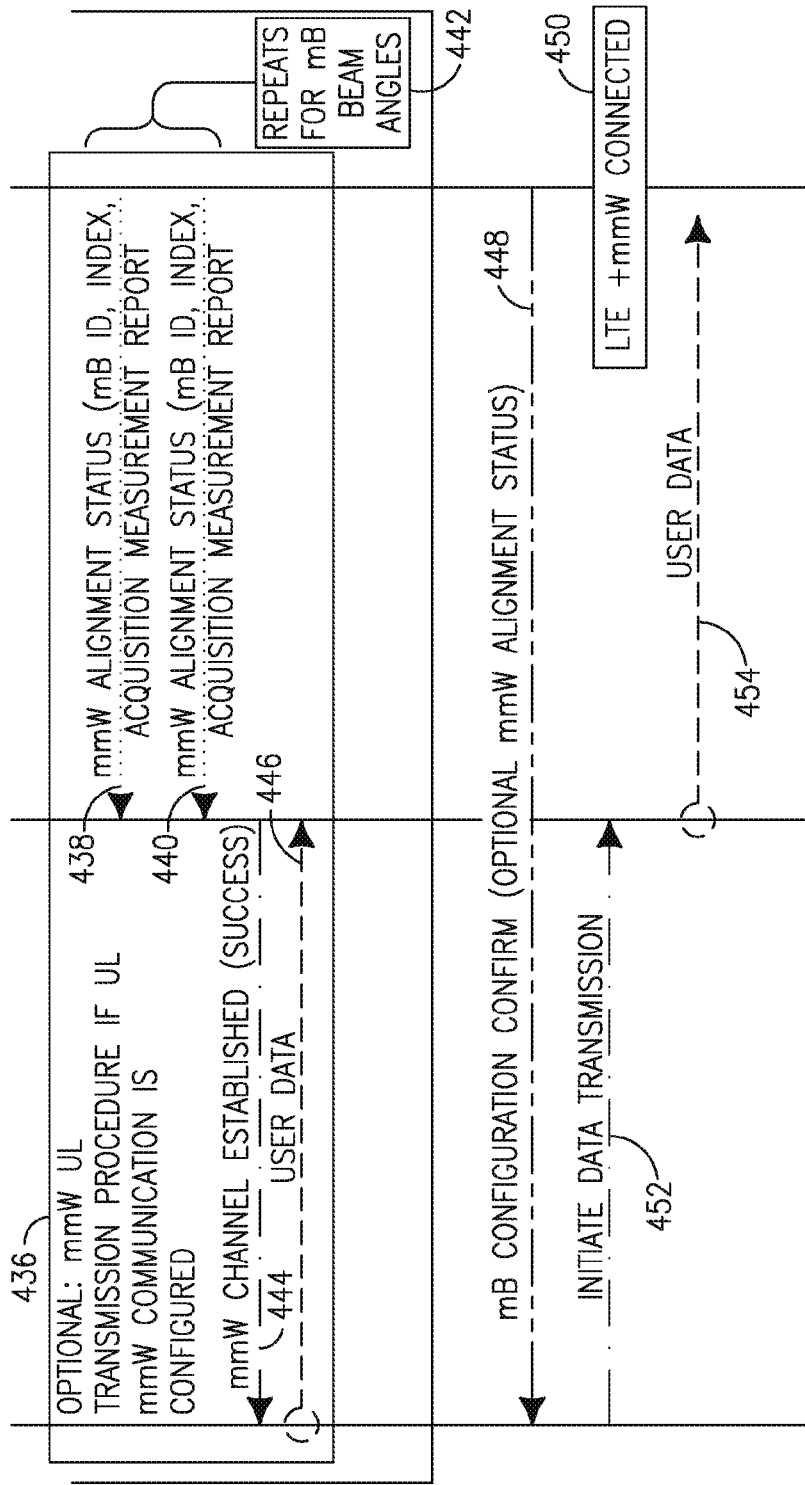

FIGS. 4A and 4B show an example mmW acquisition message flow sequence 400 to enable the mmW acquisition described herein above. The signaling for the mmW acquisition message flow sequence 400 may be between an eNB1 402, a target mB1B 404 and an LTE/mmW WTRU 406. Initially, the eNB1 402 and LTE/mmW WTRU 406 are connected to the LTE network (410 and 412). In a RNE system, this allows both the mB and mmW WTRU to use a meNB LTE time line as a common time reference.

The mB1B 404 may obtain basic information about the mmW WTRU, for example the LTE/mmW WTRU 406, from the cellular system to make an mmW beam allocation decision (416). This information may include mmW WTRU geographical information such as coordinates, which may be sent to the meNB from the mmW WTRU, (assuming global positioning system (GPS) capability), or may be derived by the network, which includes the cellular system and the mmW system, (i.e. the RNE). Using the mmW WTRU 406 coordinates, the meNB may generate a candidate mB list which includes mBs with the shortest distances. The meNB may also refine the candidate mB list according to a data base that collects historical mmW link data. For example, the data base may include ranges of received mmW power from given mB/beam combinations for each geographical zone, (as determined by the mmW WTRU coordinates). Using historical information from the data base, the meNB may possibly remove mBs from the candidate list if they do not have line-of sight (LOS) to the mmW WTRU or add a new mB with a prior successful connection. Additionally, the LOS information as well as other parameters that affect link establishment quality may be utilized to classify mB into different tiered priority candidate lists.

From the data base, the meNB may select preferred beams for each mB in the candidate list. In the case where historical data is not available, all possible beams available at the mB may be assigned as preferred beams. This may happen where there is a lack of historical data, such as when the network is newly deployed. In addition, for an mmW WTRU that is capable of reporting device orientation, (with the in-device gyro meter support), the preferred beam list may be further refined. The preferred beam list may be refined considering the current mB loading condition and the ability to satisfy quality of service (QoS) requirements for the mmW WTRU. In an example, the meNB may adopt predetermined filtering criteria to generate alternative (multiple) mB link candidate lists, each corresponding to specific system connectivity scenario filtered, (e.g. links with minimum backhaul hops, links with least backhaul delay, links incurring least system traffic load, links with least inter-cell-interference, links supported only with LOS, links supported by NLOS, and the like), to allow the meNB to make dynamic mmW candidate link selections corresponding to instantaneous link status feedback based on the information available, (e.g. user traffic QoS requirement, system load balancing input, LOS input, mmW WTRU location feedback (with/without orientation information)), or if configured, periodic mmW link measurements feedback.

The information may also include timing relationships between the mmW WTRU and the mB, which may be coarsely derived from the mmw WTRU-meNB timing and mB-meNB timing.

Once the allocation decision has been made, the eNB1 402 may initiate MMW link establishment (418). The eNB1 402 may send an mB configuration request message to a target mB1B 404 to reserve mRU (420). As part of mRU reservation, the acquisition mode and acquisition start time, (specified in the number of mmW symbol relatives to a LTE subframe), are determined by the eNB1 402. The target mB1B 404 may configure PHY assignment and update PHY scheduling assignment (422). The eNB1 402 may signal the set of information to the LTE/mmW WTRU 406 in an mmW configuration request message using the underlying cellular network (424). The target mB1B 404 may send an mB configuration confirmation (426).

The mmW acquisition process may then be executed (428). This may include target mB1B 404 downlink (DL) channel synchronization, which includes obtaining frequency, time and mmW frame synchronization, mB ID and a transmission beam index (430). This synchronization may be done by sending beacon transmissions (432 and 434) to the LTE/mmW WTRU 406.

An mmW uplink (UL) transmission procedure may be executed if mmW UL communication is configured (436). The LTE/mmW WTRU 406 may transmit multiple mmW alignment status messages 438 and 440 to the target mB1B 404. This may be repeated for multiple mB beam angles (442). The target mB1B 404 may transmit a mmW channel established success message to the eNB1 402 (444) and the eNB1 402, in turn, may transmit user data to the target mB1B 404 (446).

The LTE/mmW WTRU 406 may transmit an mmW configuration confirmation message to the eNB1 402, which may include an mmW alignment status message (448). The LTE/mmW WTRU 406 may then be connected to both the LTE and mmW networks (450) The eNB1 402 may transmit an initiate data transmission message to the target mB1b 404 (452). The target mB1b 404, in turn, may transmit user data to the LTE/mmW WTRU 406 (454).

Figure 5:
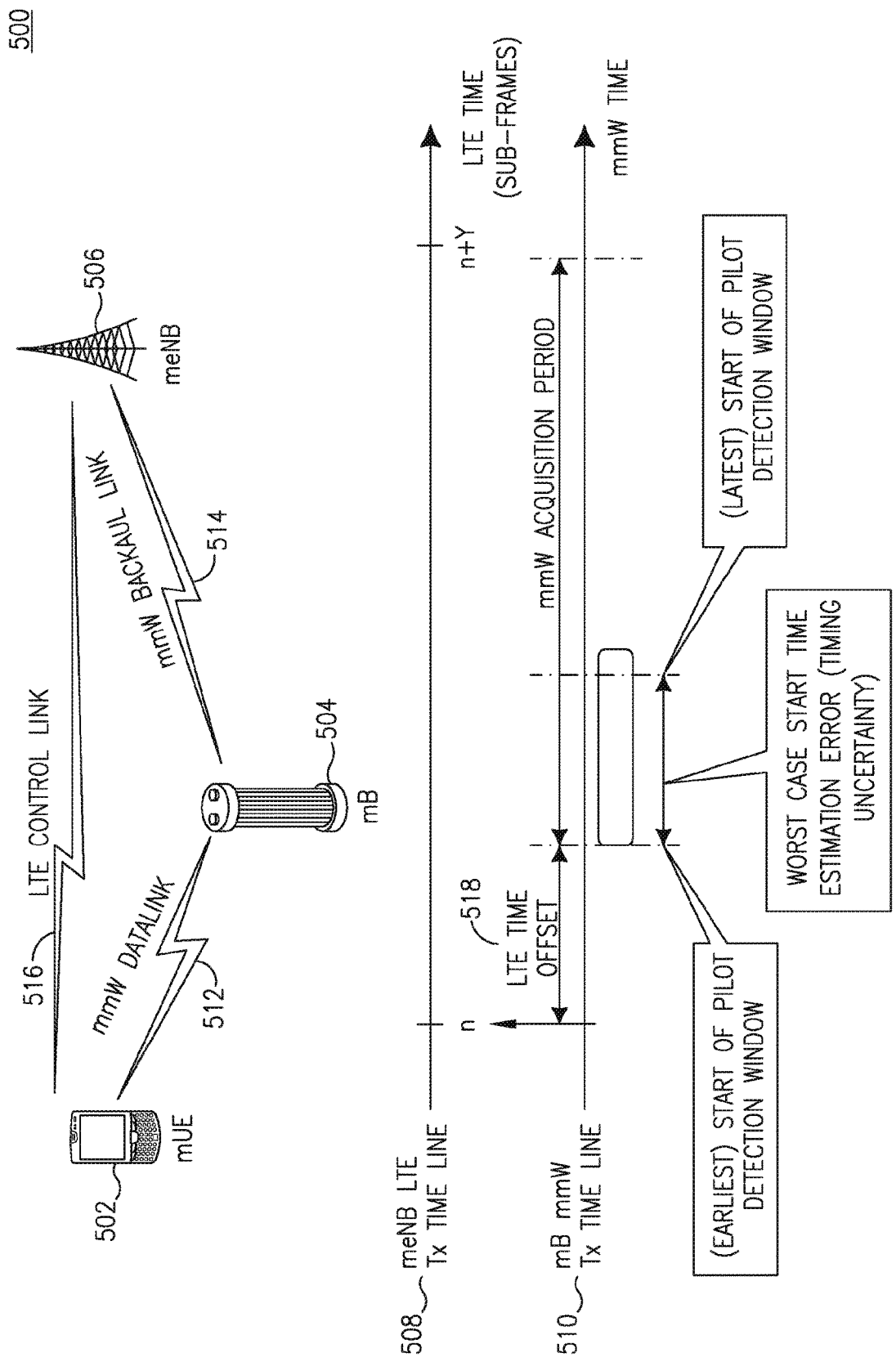
FIG. 5 is an example initial mmW acquisition procedure starting time configuration.

FIG. 5 shows example RNE architecture 500 including an mmW WTRU 502, a mB 504 and a meNB 506, overlaid with a meNB LTE transmission timeline 508 and a mB mmW transmission time line 510. The mmW WTRU 502 may be communicating with the mB 504 using a mmW data link 512, the mB 504 may be communicating with the meNB 506 using a mmW backhaul (BH) link 514 and the meNB 506 may be communicating with the mmW WTRU 502 using a LTE control link 516.

As illustrated in FIG. 5, two different path delays: (1) LTE from meNB 506 to mmW WTRU 502; and (2) mmW from mB 504 to mmw WTRU 502 need to be considered in determining the mmW acquisition starting time. The mmW WTRU 502 may be connected to a LTE network of any cell size which may be up to 30 Km for a macro cell while the expected mB cell coverage may be in the range of pico or smaller (<200 m) size cells. The path delay on the mmW WTRU-mB link 512 at 200 m is about 666 nano-seconds. This is insignificant when compared to the LTE path delay which may be up to 30 Km. The meNB to mmW WTRU 516 path delay on LTE is derived from the "timing advance" mechanism which may not be LOS. The path delay on the mmW link 512 is unknown during initial mmW acquisition. The inaccuracy in path delay on both mmW WTRU-meNB and mmW WTRU-mB links are considered and built into the "timing uncertainty". The inaccuracy is accounted for by extending the correlation sliding window length for peak detection to the detection length plus worst case timing uncertainty.

The "LTE time offset" 518 is the mmW acquisition start time and it is specified in terms of the number of mmW TTI delays from LTE frame N subframe n and takes into account the worst case signaling delay on the backhaul as well as an access link to configure the mmW WTRU to initiate mmW acquisition. This delay may be a default value per RNE deployment configuration and is adjustable by the meNB based on the dynamics of the backhaul latency monitored.

Also over the cellular link, the meNB may obtain the mmW specific capability of an mmW WTRU. Such capability information may include the number of mmW beams and beam widths the mmW WTRU may generate, and the number of transmission beams the mmW WTRU may simultaneously support. An mmW WTRU with multiple independent radio frequency (RF) chains may be able to mimic mB transmission (TX) beamforming by digital processing, and effectively have visibility to multiple TX beams simultaneously. Another method to allow multiple beam access is through filtering. The mmW WTRU may be able to separate signals from different subbands and each of the subbands may be beamformed differently. Shorter beam sweeping or faster acquisition may be achieved if the mmW WTRU is able to access multiple TX beams simultaneously.

Described herein is how to configure mmW acquisition. The meNB may inform both mB(s) and mmW WTRU of the preferred beam list, beam sweeping starting time, (probably with reference to cellular frame timing), and number of beam sweeping repetitions. The mmW WTRU may start measuring the mmW channels around the specified time, considering the timing inaccuracy obtained from the cellular system.

In some embodiments, the meNB also specifies the method and resources for mmW WTRU to send feedback information back to the network. In one embodiment, the mmW WTRU may be directed to send information to the meNB over the cellular link, and have the meNB relay the information to the mB. In an alternative embodiment, the mmW WTRU may be directed to send information over the mmW channels at a specified time/frequency and repetition.

The mmW WTRU may also be directed to feedback the highest received mmW signal strength and corresponding mB/beam indices, or feedback when the highest received mmW signal strength exceeds a certain predetermined threshold. The latter may be suitable when multiple mmW WTRUs contend for resources such as physical uplink control channel (PUCCH) in LTE. In such a case, the meNB may declare a failure after the mmW acquisition timer expires.

The meNB may also explicitly send mB and mmW WTRU the beacon sequences to be used for acquisition, or notify them to generate sequences based on mB and beam ID. The mB may verify if the resources requested by the meNB may be supported and provide the response in an mB configuration confirmation message 448 as shown in FIG. 4.

Described herein is beacon transmission and beacon frame design. Beacon transmission is over a specified time and frequency band as specified by the meNB. Beacon symbols may be modulated by the mB and beam specific sequences, which may be determined statically based on the mB and beam ID, or allocated semi-dynamically to avoid the need for large number sequences. The sequences should have good auto-correlation and cross-correlation properties. For example, sequences that may be suitable include Zadoff-Chu sequences or pseudo-random noise (PN) sequences that are used in WCDMA systems.

Figure 6:
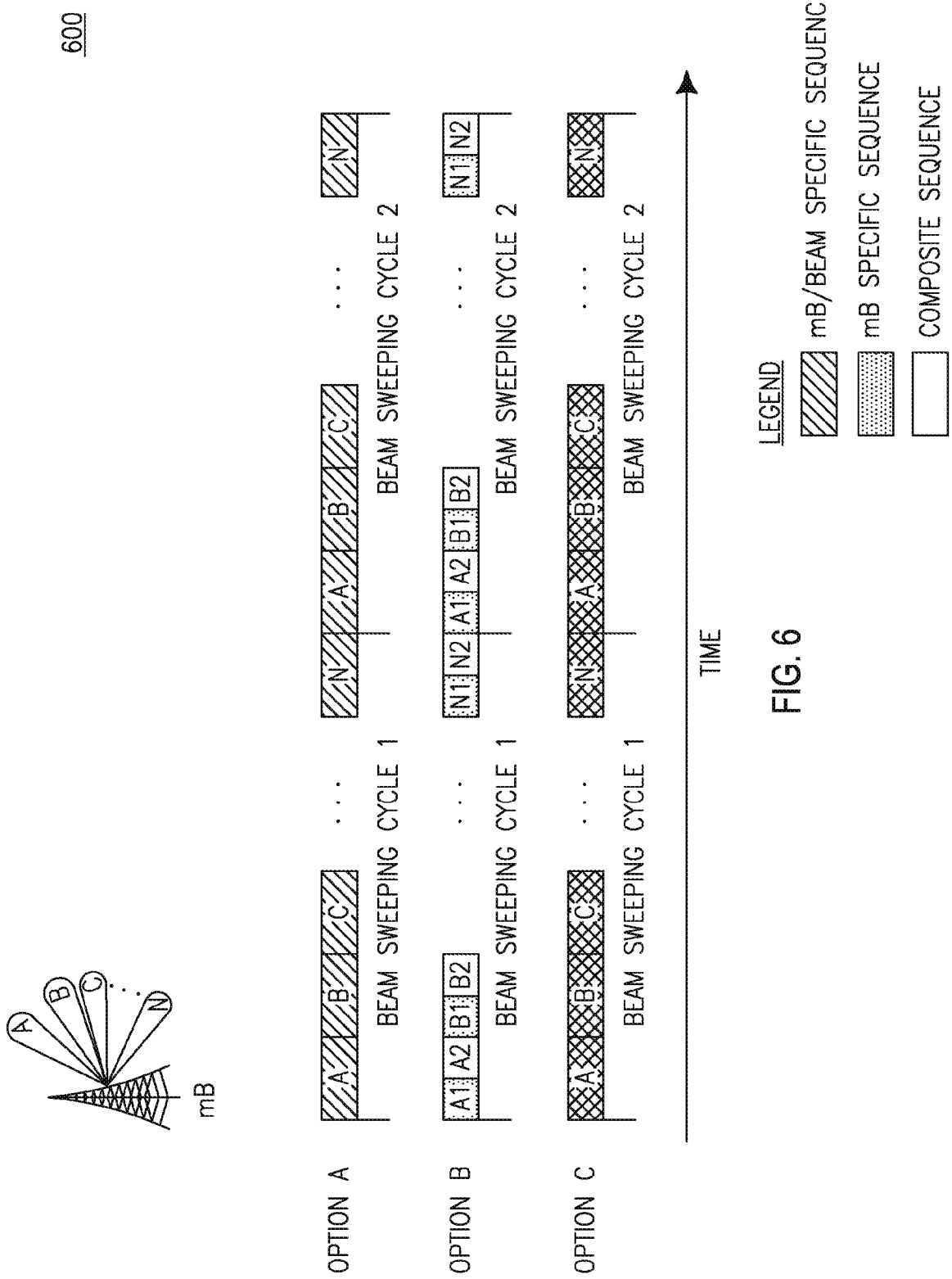
FIG. 6 is an example of beacon transmission schemes.

FIG. 6 shows embodiments (600) for modulating a beacon with mB and/or beam specific sequences. In one embodiment (A), single stage modulation is applied. A unique sequence is generated for each distinct mB/beam combination, and multiplied with a known pilot symbol sequence. In another embodiment (B), the modulation is done in two stages. The beacon is divided in two portions, for example, in time or frequency. The first portion is only modulated by an mB specific sequence (S1) and the second portion is modulated by a composite sequence of both mB (S1) and beam specific sequence (S2). The composite sequence is obtained by element-wise multiplication of the two sequences S1 and S2. The latter may reduce the total number of sequences and the mmW WTRU complexity and power consumption. In another embodiment (C), the beacon may be modulated by an mB specific sequence, (but not a beam specific sequence). In this embodiment, the mmW WTRU may first acquire beacon transmission timing, and then derive beam indices from it. Due to initial timing inaccuracy, the beacon frame should be long enough to overcome the initial timing inaccuracy.

Multiple beacons may also be transmitted simultaneously, but on different frequency bands. For example, mB may transmit beam A, C, E, . . . on frequency band 1, and beam B, D, F, . . . on frequency band 2.

Described herein is mmW WTRU processing. As described herein above, the mmW WTRU may obtain the acquisition start time from the LTE layer. Based on this information as well as the timing uncertainty guard interval, the mmW WTRU determines the time to start the procedure to detect beacons transmitted by the mBs. The detection procedure completes on mmW WTRU successfully synchronized in time with the mB providing the largest received beam energy, which is also the beam it wishes to establish the data transmission as described with respect to FIG. 3. In addition to the time synchronization achieved by this process, the mmW WTRU may also obtain the mB and beam identity, (i.e. cell and beam identity), that may be used to extract various cell specific properties.

Depending on the beacon transmission method, the detection of the beacons may take different forms. Common to all, the initial detection of the signals is performed via autocorrelation, i.e. a sliding window filtering procedure. With the knowledge of the mB/beam specific sequences provided by higher layer (e.g. radio resource control (RRC) signaling), the mmW WTRU autocorrelates the received signal with the candidate mB/beam specific signals. The mB and beam specific signals may be orthogonal to each other in order to minimize the autocorrelation among different mB and beam candidates. The output of the sliding window filtering gives the peak energy value, from which the mB beam transmission time, as well as the corresponding mB and its particular beam may be determined.

Figure 7:
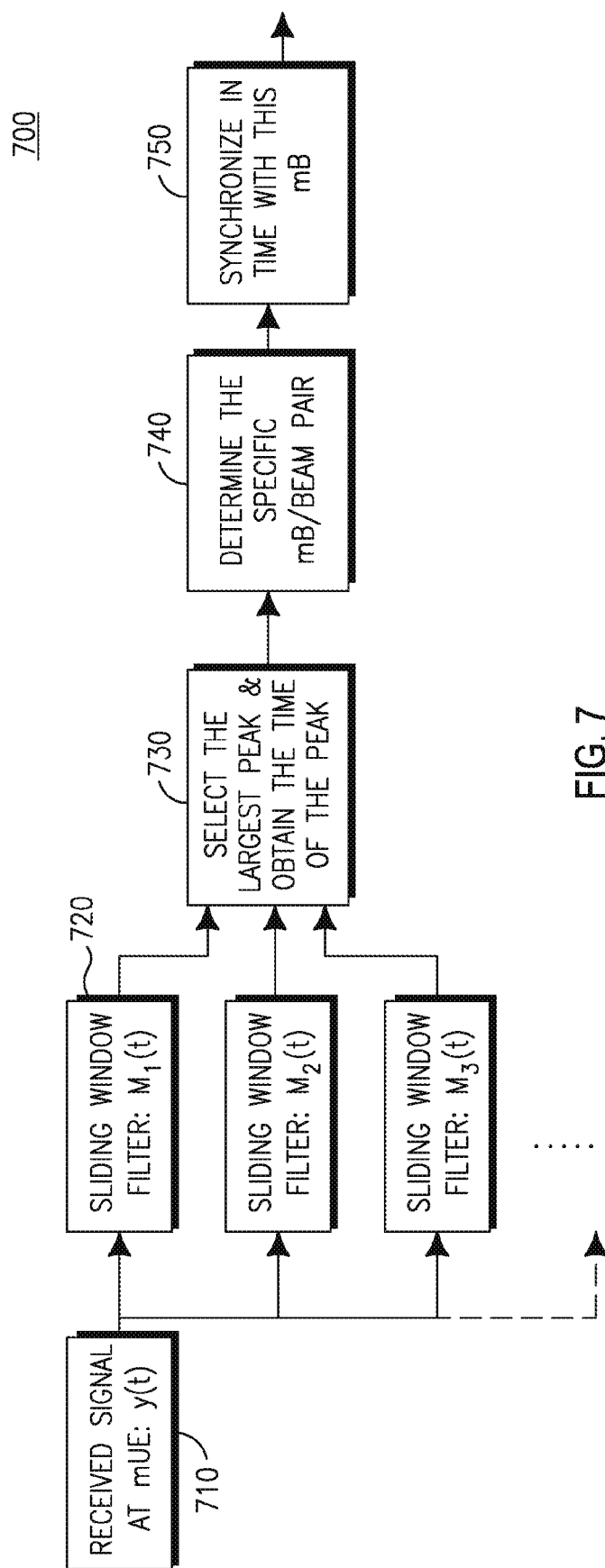
FIG. 7 is an example of an mmW base station/beam detection and time synchronization block for single stage modulation.

In the case of single stage modulation, the largest peak energy detected also determines the specific mB/beam pair with the largest received energy. FIG. 7 shows an example block diagram 700 of time synchronization and mB/beam selection. A received signal (710) is autocorrelated via sliding window filtering with the modulated beacon signals which are denoted as $M_i$, i=1, . . . , N (720). Note that each $M_i$, i=1, . . . , N, is uniquely modulated with the mB/Beam sequence (signature). The largest peak is selected and the time of the largest peak is obtained (730). The specific mB/beam pair is then determined (740) and the specific mB is time synchronized (750).

Figure 8:
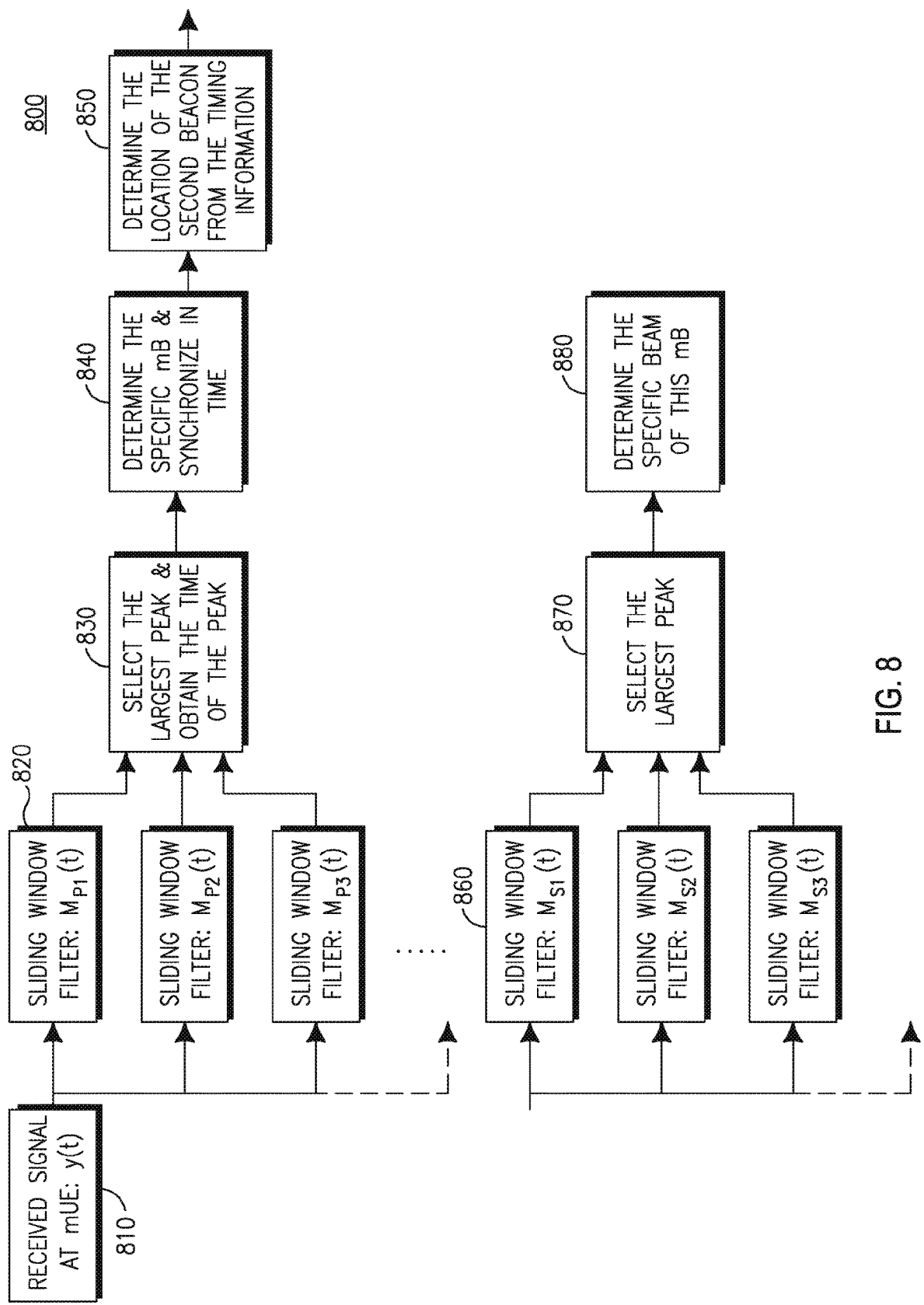
FIG. 8 is an example of an mB/beam detection and time synchronization block for separately modulated beacons.

In embodiments having a beacon with multiple pieces, different parts are modulated with unique signatures such as mB specific, beam specific, or a combination of both. In embodiments with the beacon divided in time, the autocorrelation of the first part provides the timing synchronization and moreover, the location of the remaining split. However, the additional information extracted from the second part may give more detailed information such as beacon frame timing and the specific beam identity. FIG. 8 shows an example block diagram 800 for the mB and beam detection and time synchronization for separately modulation beacons. As opposed to the single stage modulation scheme 700 shown in FIG. 7, after receipt of the signal (810), the initial step employs sliding window filtering (820) in order to determine the particular mB ID (signature) from which the largest signal is received from (830). This initial filtering is carried by $M_{pi}$, i=1, 2, . . . k unique signals that correspond to k number of mBs the mmW WTRU wishes to perform acquisition. As shown, after detecting the particular mB the mmW WTRU may synchronize with it in time (840). Moreover, since the location of the second beacon split is already known, the mmW WTRU is able to determine the location of the second beacon split (850). Another set of sliding window filtering is performed for this beacon, where the filtering signals are denoted as $M_{si}$, i=1, . . . , n (860). Here, n gives the possible beam signatures. The filtering operation outputs the particular beam of the already selected mB with the largest received power (870 and 880).

In embodiments where only mB specific sequences are carried by the beacons, mmW WTRU may derive the ID of the strongest beam from the timing relationship. If the mmW WTRU detects the strongest peak at time T, and assumes the beacon transmission starts at $T_0$ and the beacon interval is D, (both are known to the mmW WTRU in the mmW configuration phase), then the ID of the strongest beam is calculated as:

$$I = \text{round}((T-T_0)/D) \qquad \text{(Equation 1)}$$

Due to timing inaccuracy, there is an offset between the beacon transmission time viewed by the mmW WTRU, which is To, and actual transmission time at mB. To ensure the correct detection of beam ID, the beacon interval should be at least two times the maximum timing offset.

Described herein is the mmW WTRU reporting. In some embodiments, once the mmW WTRU has detected the strongest mB/beam combination(s), and corresponding channel quality, the mmW WTRU reports the results, (which may include some or all of, but are not limited to: the mB/beam indices and corresponding channel quality indicator, timing offset between mmW and cellular system), back to the network using mmW or cellular channels specified by the meNB. If the cellular channels are specified, then the mmW WTRU feedback may be carried on the PUCCH or piggy backed on the mmW Configuration Confirm message carried on the physical uplink shared channel (PUSCH). The meNB may then decode the proper cellular uplink channel, and forward the information to the mB. If the mmW channel is specified, the mmW WTRU may then apply the proper coding and modulation which are specified by the meNB, and transmit the data package with the best receiver beam. The mmW feedback transmission is repeated multiple times, (number of repetitions having been specified), so that the target mB may try multiple beams to receive the feedback.

Described herein is the mB acquisition failure recovery. The mmW acquisition procedure may utilize command/respond protocols to synchronize procedure between nodes. To prevent communication dead lock for suspending the procedure, the mmW acquisition timer is utilized as the safety net to exit the acquisition procedure from failure condition. For example, the RNE system relies on two separate wireless signaling channels for communication. This creates the scenario where the mmW WTRU may be able to receive mmW configuration messages from the meNB on the LTE channel but not able to acquire mmW signals from the assigned mB. One such possible scenario is when a truck pulls up and blocks the LOS to the mB across the street. If there is no alternative mB or reflective path that may reach the target mmW WTRU, the mmW signal acquisition procedure will fail. In this scenario, if the mmW WTRU is not able to transmit mmW configuration failure messages back to the meNB on the UL LTE, the mmW acquisition timer expires triggering the meNB to abort the mmW acquisition procedure and revert back to LTE for data service.

In the case where the meNB receives mmW acquisition failure messages from the mB and/or mmW WTRU before mmW acquisition timer expires, the meNB may alternatively initiate another mmW acquisition procedure with the remaining (unattempted) mB/beam candidates before reverting back to LTE for data access.

Once the mmW acquisition timer times out, the meNB may temporarily suspend attempts to configure the mmW channel to the targeted mmW WTRU and configure the mmW WTRU for data access on the LTE network until new/updated mmW measurement data is received. The meNB may signal a new mmW measurement configuration message to the mmW WTRU upon mmW acquisition timer expiry.

Embodiments

1. A method, implemented at a wireless transmit/receive unit (WTRU), for millimeter wave (mmW) beam acquisition, comprising transmitting millimeter wave (mmW) WTRU (mmW WTRU) information over a cellular system to a base station.

2. The method of embodiment 1, further comprising receiving a list of candidate mmW base stations (mB) including mmW acquisition start timing information.

3. The method of any preceding embodiment, further comprising calculating correlation values around the received mmW acquisition start timing information for the mBs in the list.

4. The method of any preceding embodiment, wherein the mmW acquisition start timing information includes coarse timing information relative to the cellular system timing.

5. The method of any preceding embodiment, further comprising receiving at least one of a number of beam sweeping repetitions, mB and beam specific indices corresponding to signature sequences, and resource assignments for mmW WTRU reporting.

6. The method of any preceding embodiment, wherein the mmw WTRU performs sliding window correlations using signature sequences corresponding to mBs and beams in the list.

7. The method of any preceding embodiment, further comprising generating a message including the N highest received mmW signal strengths across the candidate mB and beam combinations and associated mB and beam indices.

8. The method of any preceding embodiment, further comprising transmitting feedback information over at least one of a cellular link or an mmW link as directed by the base station.

9. The method of any preceding embodiment, further comprising transmitting at least one of highest received mmW signal strength and corresponding mB/beam indices, and highest received mmW signal strength exceeding a predetermined threshold.

10. The method of any preceding embodiment, further comprising detecting modulated beacons transmitted by mBs.

11. The method of any preceding embodiment, further comprising correlating the modulated beacons with a sliding window filter.

12. The method of any preceding embodiment, further comprising determining a specific mB and beam pair based on highest peak energy on a condition that single stage modulation is used.

13. The method of any preceding embodiment, further comprising determining beacon frame timing and specific beam identity on a condition that multiple stage modulation is used.

14. A method, implemented at a base station, for millimeter wave (mmW) beam acquisition, comprising obtaining millimeter wave (mmW) WTRU (mmW WTRU) information over a cellular system, wherein the mmW WTRU information includes at least one of location, coarse timing and mmW capability at the mmW WTRU.

15. The method of any preceding embodiment, further comprising generating a candidate millimeter wave base station (mB) list using the mmW WTRU information and at least distance criteria.

16. The method of any preceding embodiment, further comprising transmitting the candidate mB list and mmW acquisition start timing information to the mmW WTRU and candidate mBs;

17. The method of any preceding embodiment, further comprising receiving N highest received mmW signal strengths across the candidate mB and beam combinations and associated mB and beam indices.

18. The method of any preceding embodiment, further comprising determining viability of mmW link based on the N highest received mmW signal strengths and mB load status.

19. The method of any preceding embodiment, wherein the candidate mB list considers grouping of mmW WTRUs with same mobility pattern as candidate mBs and the base station.

20. The method of any preceding embodiment, wherein the candidate mB list is obtained using historical data from a database.

21. The method of any preceding embodiment, wherein a preferred beam list is determined from at least one of the database, reported mmW WTRU orientation, mB loading condition, and quality of service.

22. The method of any preceding embodiment, wherein the candidate list is determined based on at least one of on line of sight (LOS) information, and prior successful connection.

23. The method of any preceding embodiment, wherein the candidate mB list is determined using a predetermined filtering criteria to generate multiple candidate mB lists, each of the multiple candidate mB lists corresponding to different system connectivity scenarios that are filtered so that the base station can make a dynamic mmW candidate link selection corresponding to instantaneous link status feedback.

24. The method of any preceding embodiment, wherein the acquisition mode and acquisition start time are specified in a number of mmW symbols relative to the cellular system radio frames.

25. The method of any preceding embodiment, further comprising transmitting beacon sequence information to the mB and mmW WTRU, wherein the beacon sequence information includes one of beacon sequences or a notification to generate beacon sequences based on mB and beam ID.

26. A method, implemented at a millimeter wave (mmW) base station (mB), for mmW beam acquisition, comprising receiving an mB configuration request from a base station including at least an acquisition start time and a preferred beam list.

27. The method of any preceding embodiment, further comprising the acquisition start time, transmitting acquisition beacons on an assigned mmW resource unit (mRU) using sequential beams as listed in the preferred beam list.

28. The method of any preceding embodiment, wherein the acquisition beacons are modulated by at least one of beam specific sequences and mB specific sequences.

29. The method of any preceding embodiment, wherein the acquisition beacons are divided into parts and the parts are modulated by at least one of mB specific sequences and a combination of mB specific sequences and beam specific sequences.

30. A method comprising at a user equipment (UE), acquiring millimeter wave (mmW) UE (mUE) information from a cellular system.

31. The method of any preceding embodiment, further comprising receiving at the UE a candidate list of candidate mmW base stations (mB) including physical layer mmW acquisition start timing information.

32. The method of any preceding embodiment, further comprising calculating correlation values based on the received mmW acquisition start timing information for the mBs in the candidate list.

33. The method of any preceding embodiment, wherein the cellular system is LTE, UMTS, or WIMAX.

34. The method of any preceding embodiment, wherein the mUE information includes one of the following location, coarse timing, mmW capability of mUE.

35. The method of any preceding embodiment, wherein the acquisition start timing information includes coarse timing information relative to the cellular system timing.

36. The method of any preceding embodiment, further comprising receiving at the UE a number of sweeping repetitions.

37. The method of any preceding embodiment, wherein the number of sweeping repetitions is derived from mUE capability information and/or location information.

38. The method of any preceding embodiment, wherein the UE also receives mB and beam specific indices corresponding to signature sequences.

39. The method of any preceding embodiment, wherein the UE also receives mUE reporting resource assignments.

40. The method of any preceding embodiment, wherein the UE performs sliding window correlations using signature sequences corresponding to mBs and beams in the candidate list.

41. The method of any preceding embodiment, wherein the mUE generates a message including the N highest received mmW signal strength across the candidate mB/beam combinations and associated mB and beam indices.

42. A method comprising receiving a mB configuration request from an e Node B (eNB).

43. The method of any preceding embodiment, further comprising transmitting from a mB at an acquisition start time, acquisition beacons on the assigned mRU, and with sequential beams.

44. The method of any preceding embodiment, wherein the beacons are modulated by a plurality of beam specific sequences.

45. A method comprising obtaining at an e Node B (eNB) location information of a mUE.

46. The method of any preceding embodiment, further comprising generating a candidate millimeter wave base station (mB) list using the location information and a distance criterion.

47. The method of any preceding embodiment, further comprising acquisition mode and acquisition start time (specified in number of mmW symbol relative to LTE subframe) are determined 48. The method of any preceding embodiment, wherein the location information comprises the UE's coordinates obtained from the UE, or is derived by the network.

49. The method of any preceding embodiment, wherein the candidate list is obtained using historical data from a database.

50. The method of any preceding embodiment, wherein the candidate list is determined based on line of sight (LOS) information.

51. The method of any preceding embodiment, wherein the eNB also receives UE device orientation information.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A wireless transmit/receive unit (WTRU) comprising:
a processor; and
a transceiver;
the processor and a transceiver configured to receive a plurality of signals, wherein the plurality of signals is swept over time using a respective plurality of beams, wherein each signal of the plurality of signals includes a sequence based on an index of a respective one of the plurality of beams;
the processor and the transceiver configured to take a measurement of a first signal of the plurality of signals; and
the processor and the transceiver configured to transmit a measurement report including the measurement of the first signal of the plurality of signals and the index of a respective one of the plurality of beams.

2. The WTRU of claim 1 further comprising the processor and the transceiver configured to receive, prior to receiving the plurality of signals, measurement configuration information, wherein the measurement configuration information includes the index of a respective one of the plurality of beams and a signal strength threshold for reporting the measurement.

3. The WTRU of claim 2, wherein the measurement configuration information is received from a Long-Term Evolution (LTE) network node and the first signal is for a non-LTE network node.

4. The WTRU of claim 3, wherein the non-LTE network node is a millimeter wave network node.

5. The WTRU of claim 2 wherein the measurement configuration information includes an indication of a frame and a subframe to take measurements of at least one of the plurality of signals, wherein the frame and subframe are of a Long-Term Evolution (LTE) network node that transmitted the measurement configuration information.

6. The WTRU of claim 1, wherein each of the plurality of signals are beacons.

7. A method comprising:
receiving, by a wireless transmit/receive unit (WTRU), a plurality of signals, wherein the plurality of signals is swept over time using a respective plurality of beams, wherein each signal of the plurality of signals includes a sequence based on an index of a respective one of the plurality of beams;
measuring, by the WTRU, a first signal of the plurality of signals; and
transmitting, by the WTRU, a measurement report including the measurement of the first signal of the plurality of signals and the index of a respective one of the plurality of beams.

8. The method of claim 7 further comprising, prior to receiving the plurality of signals, receiving, by the WTRU, measurement configuration information, wherein the measurement configuration information includes the index of a respective one of the plurality of beams and a signal strength threshold for reporting the measurement.

9. The method of claim 8, wherein the measurement configuration information is received from a Long-Term Evolution (LTE) network node and the first signal is for a non-LTE network node.

10. The method of claim 9, wherein the non-LTE network node is a millimeter wave network node.

11. The method of claim 8, wherein the measurement configuration information includes an indication of a frame and a subframe to take measurements of at least one of the plurality of signals, wherein the frame and subframe are of a Long-Term Evolution (LTE) network node that transmitted the measurement configuration information.

12. The method of claim 7, wherein each of the plurality of signals are beacons.

13. A network node comprising:
a processor; and
a transceiver;
the processor and the transceiver configured to transmit a plurality of signals using a respective plurality of beams, wherein the plurality of signals is swept over time using the respective plurality of beams, wherein each signal includes a sequence;
the processor configured to produce each sequence based on an index of a respective one of the plurality of beams; and
the processor and the transceiver configured to receive a measurement report including a measurement of a first signal of the plurality of signals and the index of a respective one of the plurality of beams.

14. The network node of claim 13, the processor and the transceiver configured to transmit measurement configuration information, wherein the measurement configuration information includes the index of a respective one of the plurality of beams and a signal strength threshold for reporting the measurement.

15. The network node of claim 13, wherein the network node is a millimeter wave network node.

* * * * *